Jan. 26, 1937.  O. E. SZEKELY  2,069,023
VARIABLE RATIO TRANSMISSION
Original Filed June 27, 1934    7 Sheets-Sheet 1

Inventor:
O. E. Szekely,
by
Att'y

Jan. 26, 1937.  O. E. SZEKELY  2,069,023
VARIABLE RATIO TRANSMISSION
Original Filed June 27, 1934   7 Sheets-Sheet 5

Inventor:
O. E. Szekely,
by
Att'y.

Jan. 26, 1937.　　　O. E. SZEKELY　　　2,069,023
VARIABLE RATIO TRANSMISSION
Original Filed June 27, 1934　　7 Sheets-Sheet 6

Fig. 9.

Patented Jan. 26, 1937

2,069,023

UNITED STATES PATENT OFFICE 2,069,023

VARIABLE RATIO TRANSMISSION

Otto E. Szekely, Elmira, N. Y.

Application June 27, 1934, Serial No. 732,683
Renewed May 28, 1936

17 Claims. (Cl. 74—293)

The present invention relates to a variable ratio transmission of the general nature of that described in my copending application Serial No. 643,451, filed November 19, 1932.

One of the features of the present invention is a variable ratio transmission in which driving, driven and third members are connected by differentiating gearing, and a fluid displacing means is employed between the driving member and the third member, the back pressure upon this fluid displacing means being determined by restricting devices carried with the rotating system.

Another feature of the present invention is the provision of a variable ratio transmission including driving, driven and third members connected by differentiating gearing, with fluid displacing means operating as a brake between the driving and third members, along with a friction brake operating directly between the driving and driven members.

A further feature of the present invention is the provision of a variable ratio transmission which may be employed for connecting a source of power to a load, without the necessity of inclusion of any clutch device, and operating with a fluid displacing means for determining the speed and torque ratios of transmission, and with the inclusion of means for controlling the relative compressibility of the fluid being supplied to and delivered from the fluid displacing means for varying the action of the transmission.

Still another feature of the present invention is the provision of a transmission which is especially of value in automotive vehicles of various kinds, in that a direct mechanical engagement of parts is produced as a direct drive from the power plant to the load (for example, the propelling shaft of the automobile), so that the power plant and propeller shaft turn at identical speeds in such direct drive; but in which variation of the relation between the energy demanded by the load and the energy output of the power plant may effect an automatic selection of different correlation of speed and torque ratios.

A particular feature of the invention is concerned with the association of such a transmission with an automotive power plant of internal combustion type having a throttle for speed regulation, the combination being so disposed that the transmission is ineffective for propulsion effects when the power plant is being operated at idling or no-load conditions.

A still further feature of the invention is the provision of a simple and compact structure comprised essentially of parts which may be machined by simple and direct processes, and in which the several parts have ample and properly located bearings with respect to one another for receiving, distributing and balancing thrusts and other stresses.

An illustrative form of practicing the invention is shown on the accompanying drawings.

In these drawings, the transmission is illustrated as applied for connecting a gasoline engine power plant of an automobile with the propeller shaft thereof, and operating to replace the clutch and transmission assemblies normally employed therein.

The engine and crank case wall C is fixedly joined to a general transmission housing H having a rear closing plate HB which is illustrated as integrally formed with a secondary housing structure HR with a top plate HS, and connected with the bell housing D of the usual universal joint.

Figure 1:
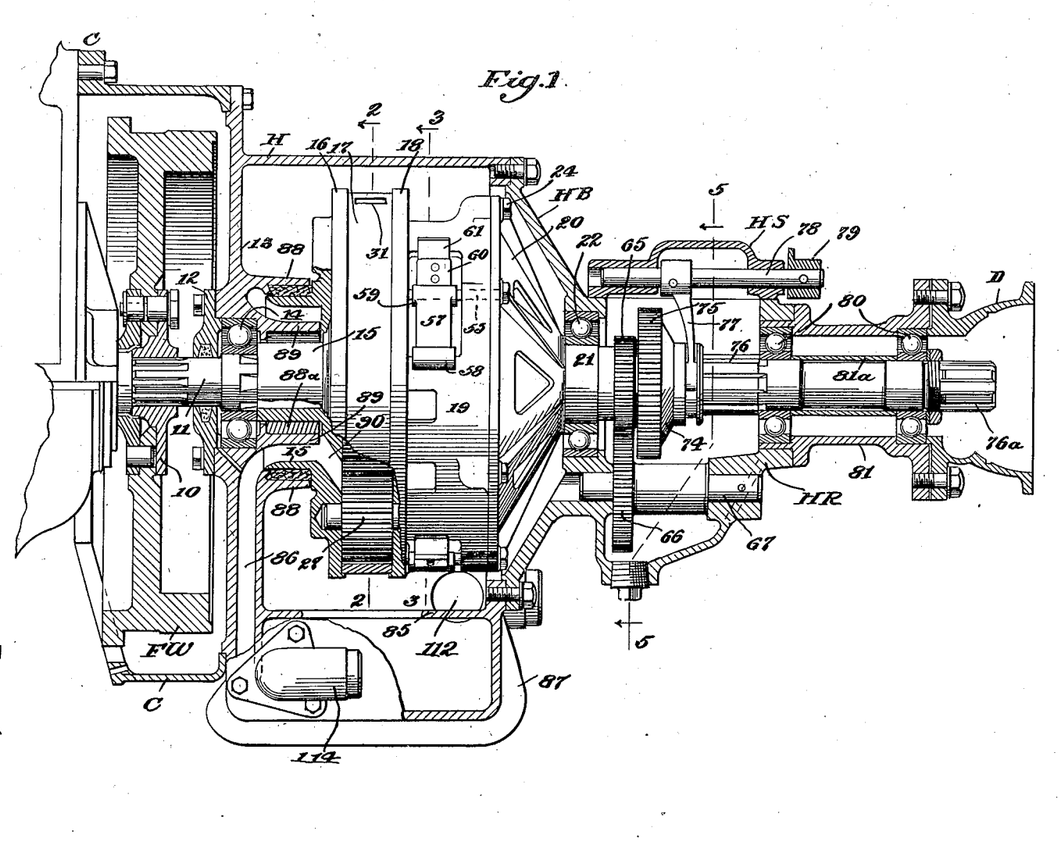
Figure 1 is an upright diametrical sectional view through the transmission.
Figure 4:
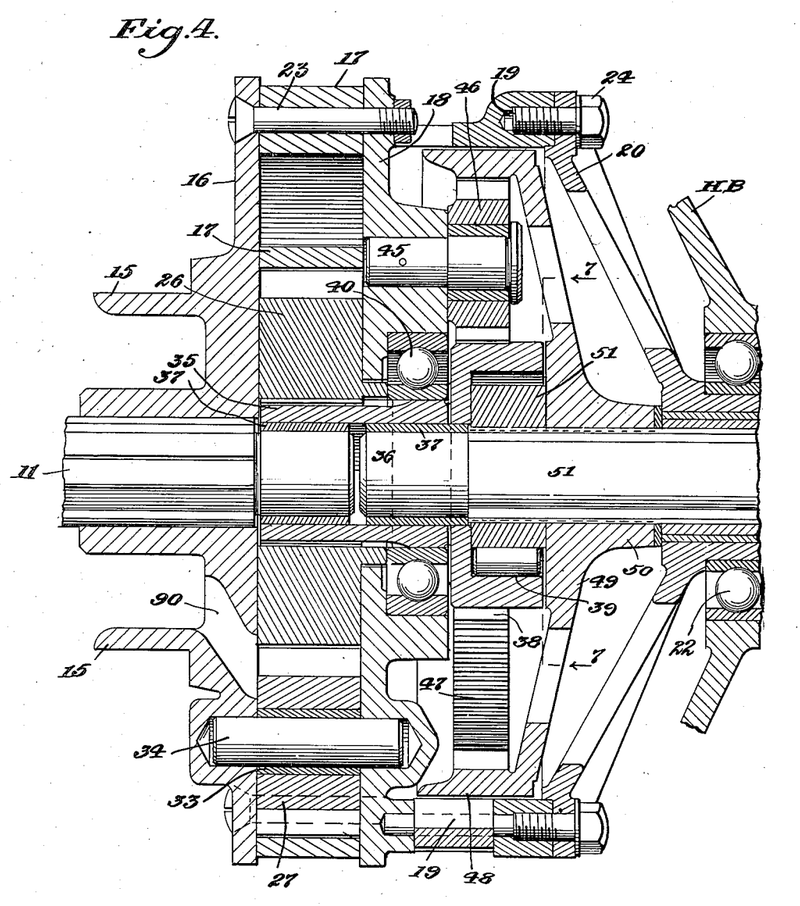
Figure 4 is a view, on a larger scale, of rotor structures, on the lines 4—4 of Figures 2 and 3.

The fly-wheel FW of the engine is bolted to a flange 10 which is in splined relation with the driving shaft 11 of the transmission, which extends through the closing plate 12 attached to the forward end wall 13 of housing H and has a packing which prevents the forward movement of oil out of the housing H. The shaft 11 is supported by the anti-friction bearing 14 in the wall 13, and extends into and is splined for driving relationship with the sleeve 15 which is integral with a radially extending flange 16 of the rotor structure. Rigid with this flange 16 is a pump housing 17 having a cylindrical external surface in the illustrated form, with internal cavities and passages, as will be described hereinafter, which are in part closed at the forward end by the flange 16 and at the rearward end by the flange 18 of a further part of the rotor structure, which includes a substantially cylindrical cage portion 19 to which is attached a conical rotor member 20 having a sleeve 21 supported by the anti-friction bearing 22 in the rear housing structure HB (Figures 1 and 4). Bolts 23 clamp the plates 16 and 18 in fixed relationship to the pump housing 17; and cap screws 24 secure the conical member 20 to the cage structure 19 and thus to the outer rotor assembly.

The interior of the pump housing 17 (Figure 2) has a central cylindrical passage 25 from face to face thereof to receive within it the inner gear 26 of a gear pump apparatus, which cooperates with the smaller pump gears 27 which are illustrated as three in number and lodged in recesses 28 having cylindrical forms constituting extensions of the central cavity 25 and likewise extending from face to face of the pump member 17. These three gears 27 cooperate with gear 26 in establishing three separate pumping portions, each of which is provided with an enlarged inlet chamber or pocket 30 and a discharge passage 31 leading chordally outward through the pump housing 17 and opening at its periphery. Each passage 31 is provided with a spool-shaped closing plug 32 whose length preferably corresponds to the thickness of the pump housing 17, and whose diameter is so calibrated with respect to the cross-section of the corresponding passage 31 that a predetermined restriction and resistance is afforded to the outward flow of the fluid medium therethrough. Each of the small gears 27 has a bushing 33 which supports it on a pin 34 carried by the flanges 16 and 18 (bottom of Figure 4). By providing three identical gears 27, spaced at 120 degrees apart, about the axis of the rotor structure, a uniform distribution of the relative energy demands is effected, and lateral bending pressures upon the shafts and parts, arising by the pump action, are compensated. It will be noted that bolts 23 are provided as necessary to bind the flanges 16 and 18 upon the housing 17 adjacent the points of maximum pressure, and that the pump housing 17 may be cored out for lightness.

Figure 7:
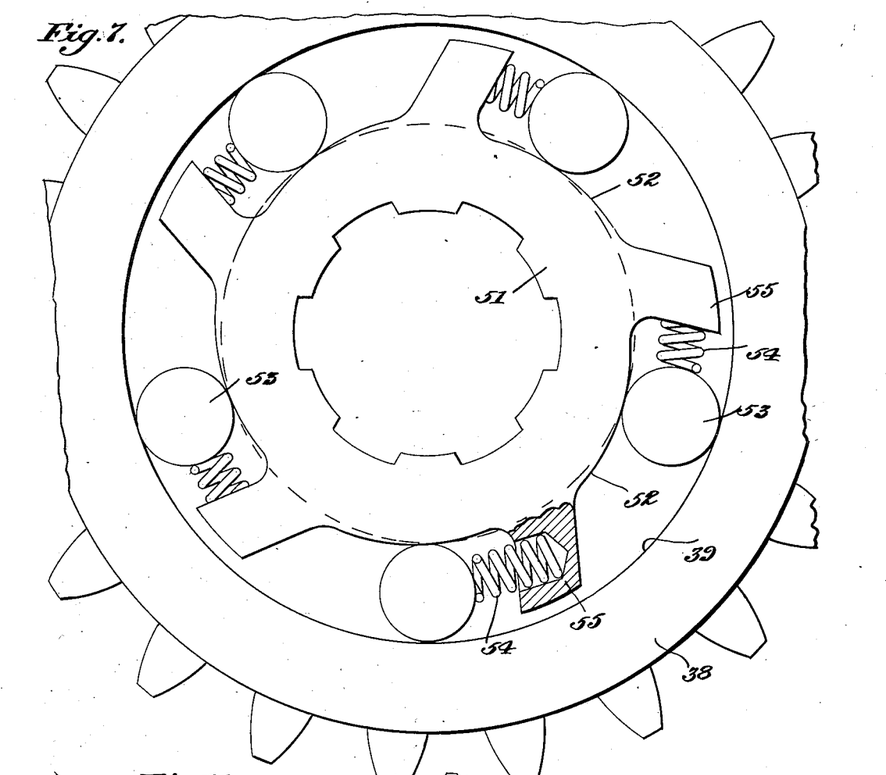
Figure 7 is a detail view on the line 7—7 of Figure 4, on a yet larger scale.

The inner gear 26 of the aforesaid pump arrangement is splined (Figures 2 and 4) on a sleeve 35 which extends over the adjacent ends of the driving shaft 11 and the driven shaft 36; independent bearing bushings 37 preferably being provided. At the rearward end, the sleeve 35 is enlarged and provides the small inner gear 38 of a differentiating epicyclic train, this gear portion being hollow to provide internally a cylindrical clutch surface 39 (Figures 3, 4 and 7). Further stiffness and freedom of movement is afforded in the rotor structure and a direct transmission of radial loads, by providing the anti-friction bearing 40 between the sleeve 35 and the rotor structure 18 and 19, as shown in Figure 4.

The flange 18 of the rotor structure also supports three pins 45 which are parallel to the common axis of shafts 11 and 36, and support the three planet pinions 46 of the epicyclic train (Figures 3 and 4). The pins 45 have enlarged heads to prevent axial movement of the pinions 46 and are illustrated as spaced uniformly at 120 degrees with respect to one another, and at an angle of 60 degrees from the location of the journal pins 34 of the pump gears 27 (see Figures 2 and 3).

Each of the planet pinions 46 meshes with the inner epicyclic gear 38 and also with the larger outer, internally cut, gear 47 which is provided externally with a cylindrical drum surface 48, and is integral with an inwardly extending apertured wall 49 and a sleeve 50. The sleeve 50 is in splined relationship to the driven shaft 36. The shaft 36 is also splined with respect to the inner clutch member 51 (Figures 3, 4 and 7), which has the eccentric clutch surfaces 52 for engaging the clutch rollers 53 against the inner clutch surface 39 of the gear 38. The clutch rollers are normally pressed toward engagement by their individual springs 54 which rest against the bottoms of recesses in the projecting clutch fingers 55.

Three pivot pins 56 extend parallel to the common axis of shafts 11 and 36 and are supported by the cage member and flange 18, 19. Each supports a drag or brake member comprising an arm 57 having a weight and stop portion 58 at its free end, a cam piece 59 immediately adjacent the corresponding pin 56, and an extension 60 to which is connected a spring 61 which bears against the outer surface of the cage member 19. The bodily movement of pins 56 during the revolution of the cage 19 causes the weights 58 to be thrown outwardly by centrifugal force against the action of springs 61, and the cam portions 59 to bear down upon and engage the external cylindrical drum surface 48 of the driven, internally cut, gear 47.

The shaft 36 is also in splined relationship with the driven spur gear 65 which is in mesh with an idler gear 66 carried by the shaft 67 which is supported in the secondary housing structure HR, this idler gear 66 in turn being in mesh with the gear 68 connected rigidly by a sleeve 69 with a gear 70, the assembly of gears 68 and 70 with sleeve 69 being supported by a shaft 71 also carried by the secondary housing HR. The gear 65 is also provided with the clutch teeth 72 which are engageable by the internally cut teeth 73 of a sliding member 74 having external teeth 75 adapted to mesh, when the clutch teeth 72 and 73 are out of engagement, with the gear 70. The member 74 is slidable along a tail shaft 76 between a forward end position in which the gear teeth 72 and 73 are engaged, and a rear end position in which gears 74 and 70 are engaged, preferably with the inclusion of a central position in which neither the clutch teeth 72, 73 nor the gears 74, 70 are in operative relationship. This movement is accomplished by the operation of a clutch fork 77 which engages in a groove of the member 74 (Figures 1 and 5), and is supported by the sliding rod 78 which is externally reciprocable by any desired means including the collar piece 79. For ease in inspection and assembly, the rod and fork are supported by the upper closing plate HS of the secondary housing HR.

Illustratively, the tail shaft 76 is supported by a pair of anti-friction bearings 80 carried by a connecting sleeve 81 and spaced by a sleeve 81a, the rear end 76a of the shaft being splined for engagement with the usual universal joint structure contained within the universal bell housing D.

Figure 2:
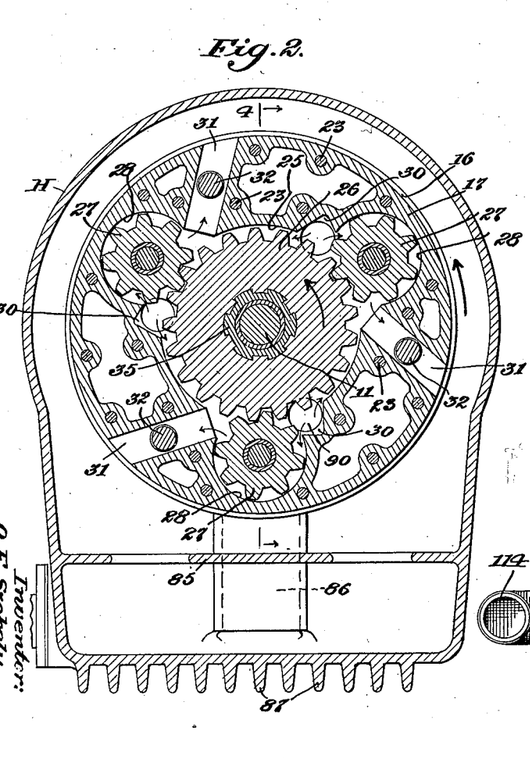
Figure 2 is a transverse sectional view on the line 2—2 of Figure 1.
Figure 3:
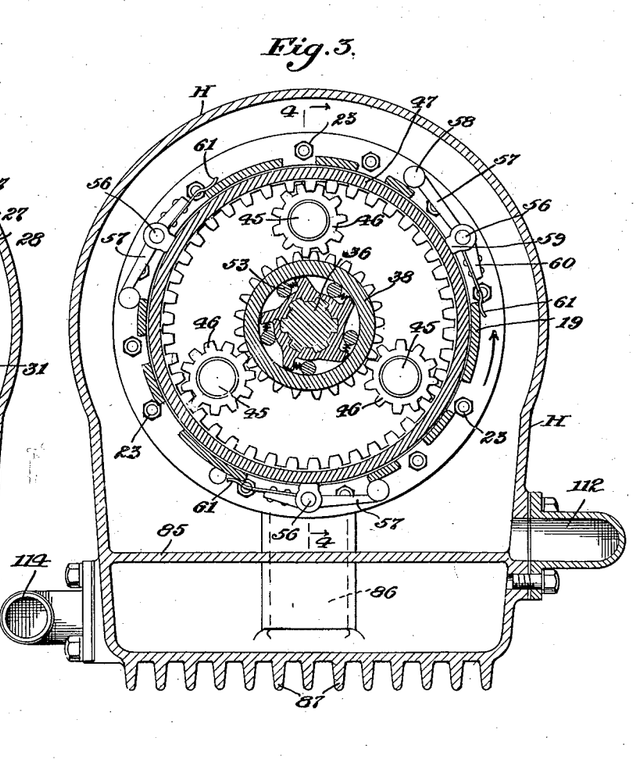
Figure 3 is a corresponding view on the line 3—3 of Figure 1.

The general housing H (Figures 1, 2, 3 and 5) has a lower portion providing a sump space which is shut off from the upper space by a horizontal partition 85 having apertures therein (Figures 1 and 2). The forward wall 13 of the housing is provided below the common axis of shafts 11, 36 and 76 with an enlargement which is hollowed to provide the suction passage 86 by which the liquid medium may be drawn from the sump and brought to the pump structure. Since the fluid medium also operates as a carrier to take up and dissipate heat effects occurring within the structure, it is preferred to provide the housing H with radiating fins or webs 87, these webs also serving to strengthen the parts and to prevent rupture of the housing wall if encountered by flying objects.

The forward end wall 13 is provided with concentric sleeves 88 and 89 extending toward the rotor system and overlapping the sleeve 15 thereof, which is received between them (Figure 1), so that the liquid medium in the suction passage 86 is brought into the supply passages 90 (Figures 1 and 2) and to the pockets 30, and thus delivered to the pump arrangement. A packing 88a is employed to seal the sleeves. In operation, it is found that such axial delivery of the liquid into the sleeve 15 is in ample quantity; and the liquid medium, substantially unmixed with air, moves upwardly in suction passage 86 and into the supply passages 90.

Figure 5:
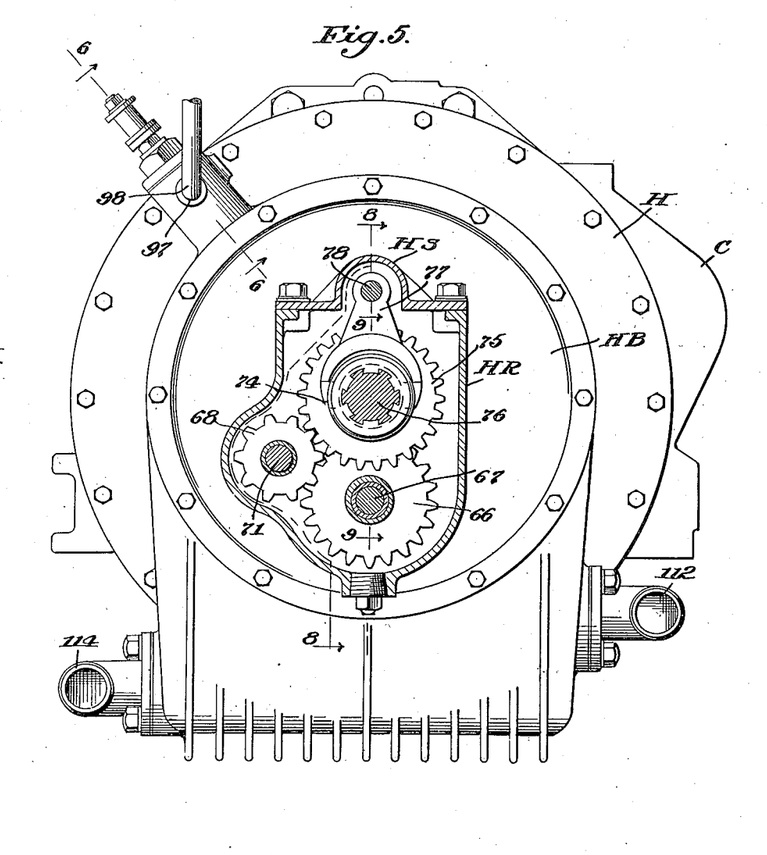
Figure 5 is a transverse sectional view, on the scale of, and substantially on, line 5—5 of Figure 1.
Figure 6:
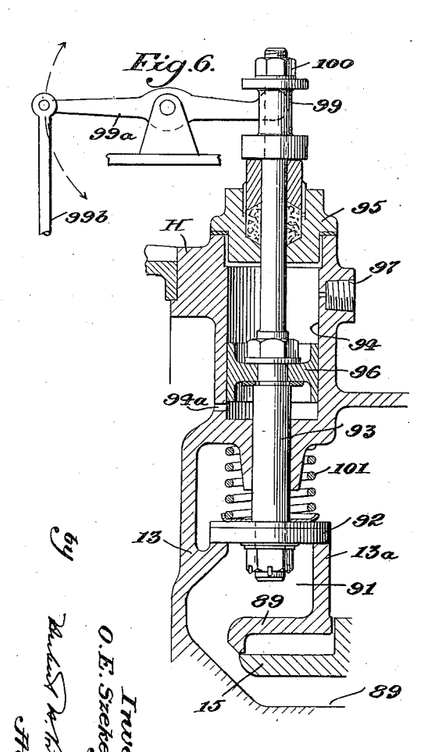
Figure 6 is an enlarged detail sectional view substantially on the line 6—6 of Figure 5.

It is, however, desirable to prevent this suction from occurring when the source of power is to be disconnected from driving relationship. For this purpose, air is permitted to enter the supply passages 90 at such a rate as to break the suction of liquid, so that the pumping action is insufficient to draw oil from the sump through the suction passage 86. A construction for this purpose is shown in Figures 5 and 6, as comprising the wall 13a which provides with wall 13 a chamber 91 in communication with the annular space between sleeves 15 and 89, i. e., the annular passage communicating with the supply passages 90. The upper part of wall 13a provides a seat for cooperation with the closure valve member 92, which is supported at the lower end of a valve stem 93 extending through a cylinder 94 and the closing packing structure 95 thereof to the exterior. Within the cylinder 94 a piston 96 is fixed to the valve stem 93. The upper cylinder space is in communication by a connection 97 and conduit 98 with the intake manifold of the engine, for example, so that a suction or low pressure is produced in the cylinder 94 when the engine is operating under idling conditions, resulting in a raising of the piston 96 and thus of the valve 92, with relief of the lower cylinder space through a small air hole 94a to the atmosphere so that air enters the chamber 91 and may totally prevent the movement of oil upwardly in suction passage 86 by satisfying the vacuum therein. Furthermore, it is possible to regulate the rate of action of the present system in bringing the propeller shaft of the car from a standstill into direct drive, as will be described hereinafter, by providing a spacer member 99 on the upper end of the valve stem 93, and adjusting the nut 100, so that the normal position of the valve closure member 92 is slightly above its seat, to permit air to enter from the interior of the housing H and mingle with the liquid medium entering the supply passages 90. The quantity of liquid pumped is therefore reduced and also a cushioning effect by the presence of the air bubbles is afforded.

The valve closure member 92 is normally urged toward its seat by the spring 101. The member 92 may be moved away from, and held away from, its seat by movement of the link 99b, to cause a counter-clockwise movement of lever 99a and thus a movement of the spacer member 99 which is engaged by its upper flange. As shown in Figure 6 the two flanges of the spacer member 99 are located farther apart than the thickness of the portion of lever 99a which is located between them, whereby the aforesaid automatic system energized from the manifold is operative to increase the opening of the closure member 92, but the position of maximum closure thereof is determined by the link 99b which thus may be operated to determine the rate of action of the system.

Figure 10:
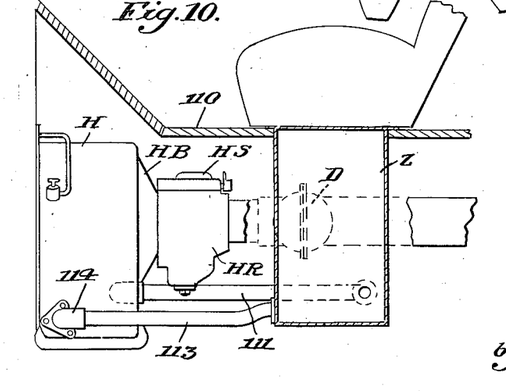
Figure 10 is a detail view, on a small scale, illustrating the employment of a separate cooling and separating chamber.

In Figure 10 is illustrated a manner of employing a separate chamber for assisting in the cooling and separation of the liquid employed. In this figure, a tank Z is mounted beneath the floor board 110 of an automobile, for example, and is connected by an intake conduit 111 with an oil outlet 112 (Figure 3) of the transmission housing proper, above the partition 85 thereof. The tank Z is also connected by a conduit 113 opening at a low level into the tank Z and also opening by a connection 114 (Figure 3) into the bottom sump space of the transmission housing H.

The operation of the system will be described in conjunction with an automobile as illustrated.

Figure 8:
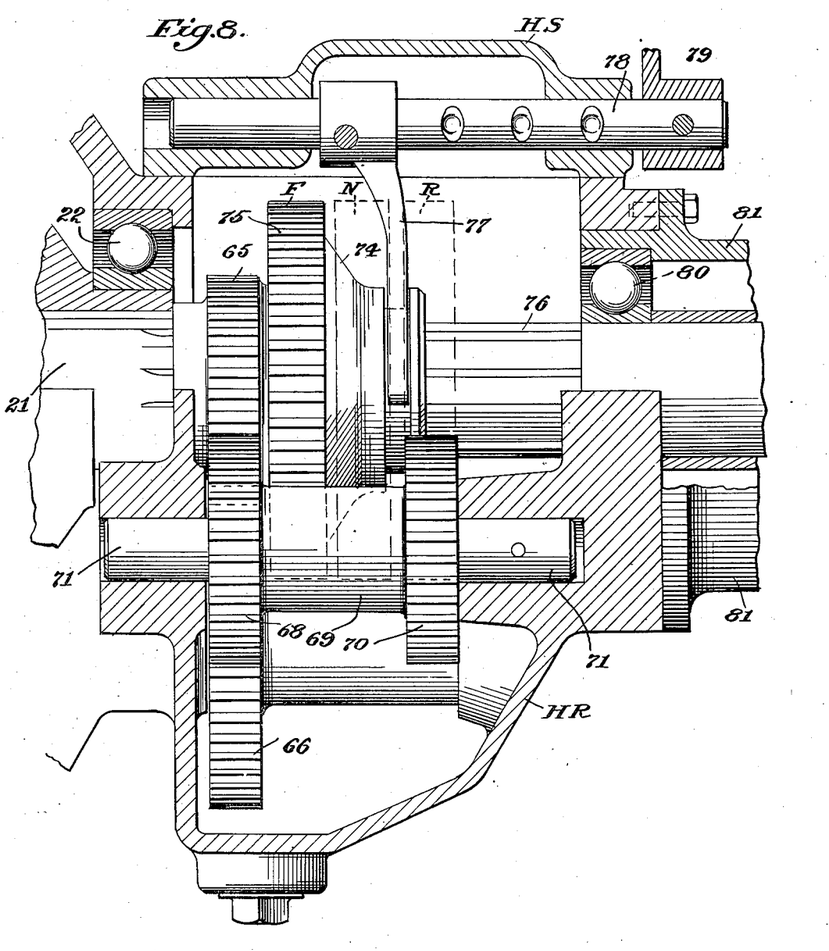
Figure 8 is a detail view, substantially on the section line 8—8 of Figure 5, and showing the reverse gearing in elevation.
Figure 9:
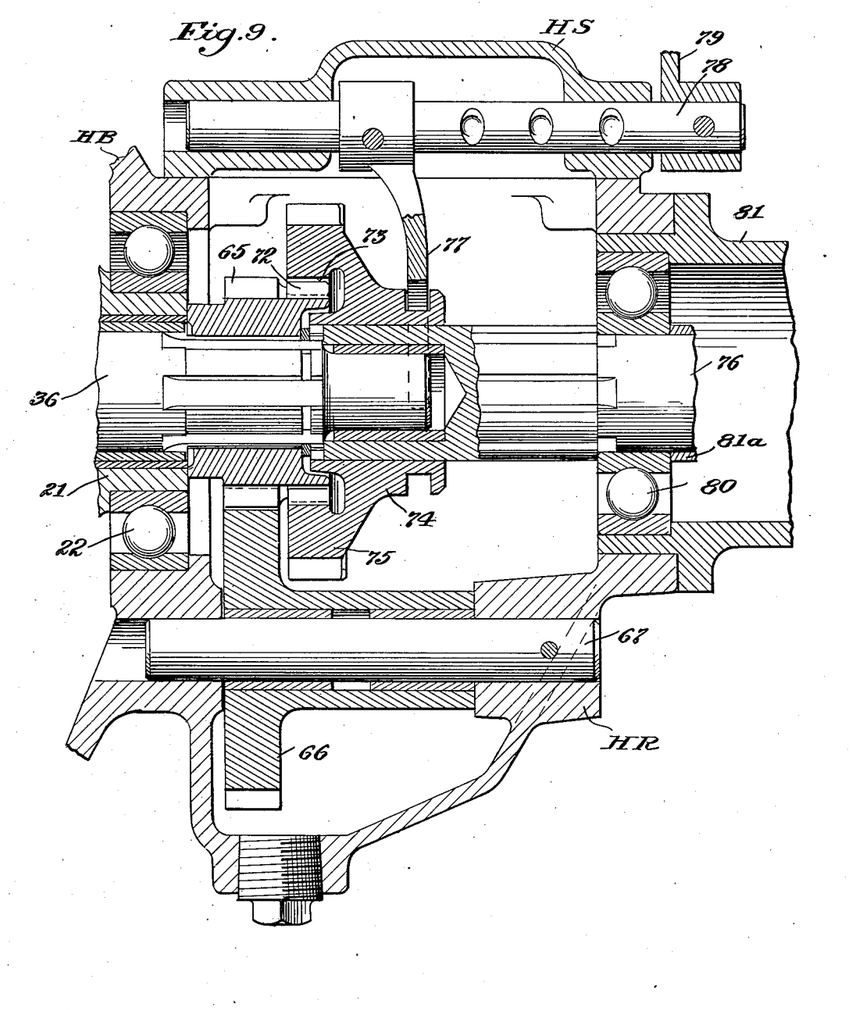
Figure 9 is a similar view on the line 9—9 of Figure 5 with the clutch parts engaged for direct drive forward.

While the automobile is at a standstill, with the engine turning over at an idling speed, the customary foot accelerator is in its fully raised position and the throttle which controls the supply of fuel mixture to the engine is at a position of maximum closure, so that the pressure prevailing within the engine manifold is below atmospheric. Under these conditions, the low pressure prevailing in conduit 98 causes a raising of the piston 96 (Fig. 6) and the valve closure member 92 is held above its seat. Air from the general housing H then enters the supply passage by which fluid is delivered to the fluid displacing means, so that the suction in passage 86 is broken and liquid does not enter the passages 90. The fluid displacing means therefore merely operates to move the air, and the plugs 32 do not oppose such resistance to the flow of this volume of air as to cause a sufficient back pressure to retard the movement of the inner pump gear 26. Furthermore, at the low idling speed, the centrifugal brake devices 57 are not operative to cause any substantial dragging action between the driving member upon which their pivots 56 are mounted with respect to the drum surface 48 afforded by the driven member. The resistance of the automobile to forward or reverse movement prevents any rotation of the driven shaft 36 while the clutch fingers 72, 73 are engaged (position F, Figure 8), or while the gear teeth on member 74 are engaged with the gear 70 (position R, Figure 8). The journal pins 45 of the planet pinions 46 are carried bodily in movement with the driving member, but these pinions are turned by engagement with the internally cut teeth of the driven member which is now at a standstill, and the inner gear 38 is driven at twice the speed of the driving member and in the same direction of rotation.

This condition endures, in the illustrative example, until the valve closure member 94 is lowered, so that a sufficient vacuum may be created in the passage 86 and associated parts to effect the delivery of liquid to the fluid displacing means. In the particular example, this may be accomplished by depressing the foot accelerator of the automobile. Thereupon, the engine manifold receives more fluid mixture and the absolute pressure therein rises, resulting in the piston 96 and valve closure member 92 being forced downward (Figure 6) by the spring 101 for wholly or partly closing the upper end of the space 91.

Since the inner element 26 of the fluid displacing means has been turning at twice the speed of the outer rotor housing 17, a pumping action is constantly occurring, and liquid now flows through the passages 90 and is delivered by the fluid displacing means into the escape passages 31 and forced past the restricting plugs 32 therein before being discharged into the general outer housing. If a limited quantity of air is still permitted to enter past the closure member 92, an elastic mixture of liquid and air is thus being handled by the fluid displacing means, but the back pressure is greater than before so that a relative braking action is occurring which retards the inner pump element 26, from the maximum speed which existed when the driven member was at a standstill, down to the speed of the driving member. This is accomplished by a tangential pressure effect upon the inner pump element 26 and a corresponding tangential reaction pressure effect upon the driving member in the direction of the rotation of the latter.

The retardation of the inner pump element 26, however, entails a lesser rate of rotation of the gear element 38, and the differentiating gearing now operates in such a manner that the pinions 46 produce a turning of the internal gear portion 47 of the driven member.

At the same time, the increase of speed of the driving member causes the centrifugal operation of the braking elements 57 so that a frictional braking effect is also established against the driven member surface 48.

Energy is thus transferred from the driving member to the driven member both directly through the centrifugal elements 57 and also through the fluid displacing means, the latter operating in accordance with the back pressure created at the restricting plugs 32. This latter action is the predominant one during acceleration and driving, and the centrifugal frictional engagement is operative largely during the initial starting period. It will especially be noted that the inner gear 38 is smaller than the outer gear 47 in the differentiating epicyclic train, and that these two elements are being subjected to equal pressures by the action of the planet pinions 46. The effective or pitch circle diameter of the inner pump element 26 of the fluid displacing means preferably has a value between the diameters of the gears 38, 47. At low starting speeds of the driven member, a high torque ratio thus exists at a low speed ratio which operates to bring the driven shaft 36 into movement in the same direction as that of the driving member and the third member structures.

If it be assumed that the power plant is operated to maintain a constant speed and power output, the high torque ratio between the driving member and the driven member causes the driven member to be increased in speed until the energy demand thereon is equivalent to the energy output of the source of power. This equivalence results, in starting an automobile on a level road, by the increase of car resistance with speed, and by decrease of the effective torque ratio with increase of car speed relative to the speed of the source, until ultimately such equivalence is reached.

During this accelerating period or starting, the transmission causes the continued acceleration of the driven member, but cannot cause the driven member to assume a speed greater than that of the driving member. It will be noted that while the driven member is at a standstill, the gear element 38 of the third member is free to turn with respect to the non-overrunning clutch elements 53 (Figure 3). When the angular velocity of the driven shaft 36 is equal to that of the element 38 of the third member, the rollers 56 establish a block by wedging in the usual way, and then the shaft 36 and element 38 turn together at the same angular velocity. At this time, however, the gear 47 and the teeth on element 38 are turning in the same direction and at the same angular velocity, and hence the planet pinions 46 cease rotating about their journals, and the driving member must also be turning at the same speed as the driven and third members. All three members are therefore free of relative movement, and the fluid displacing means merely passes a sufficient quantity of fluid to maintain this condition.

That is, the transmission operates to bring the driven shaft from a standstill up to a speed of the driving member. The rate of acceleration at which this change of velocity occurs is essentially controlled by the back pressure upon the fluid displacing means, and this in turn is primarily established by the restricting plugs 32 on one hand, and by the relative quantity of air contained with the liquid which is passing through the system. With more air there is a slower rate of acceleration, while with an entire shut off at the closure member 92, the rate of acceleration is often so high and the operation so "fierce" that it is found advantageous to restrict the closing movement of the member 92, as set out above.

It will be understood that normally the actual speed given to the driven shaft 36 is directly controlled by the foot accelerator in the usual way. So long as the three members are turning together, the entire system operates substantially in the same manner as though there were a direct connection from the source of power to the driven shaft.

When the load which establishes the energy demand upon the driven shaft 36 increases, the prevailing back pressure established by the restricting plugs 32 will not be sufficient to maintain the theretofore prevailing speed, assuming that equivalence of energy output at the power plant and energy demand upon the driven shaft has theretofore prevailed. The epicyclic gearing now operates to cause a relative movement of the inner pump element 26 of the third member, so that more fluid is pumped than before. This relative movement of the third member, however, is effected with a relative movement between the element 38 of the third member and the driven shaft 36, as well as of the element 38 with respect to the internally cut gear 47 of the driven member. A reduction of speed of the driven member thus occurs and a higher torque ratio comes into existence, until ultimately the new load upon the driven shaft 36 causes the establishment of a new condition of equivalence of speed and torque ratios in the system. It is obvious also that a change of the power output of the engine will modify the conditions, but that under any and all conditions the variable or invariable loads placed upon the driven member will automatically occasion the establishment of a condition of equivalence as aforesaid.

During the times when the three members are turning at like speeds, the centrifugal devices 57 have substantially no action, as their pivots 56 are turning with the same angular velocity as the driven member surface 48 beneath the frictional portions 59.

The above statement of operation is equally true whether the mechanism be connected at the reverse gearing, for forward or reverse motion. When the parts are engaged as shown in Figures 1, 4, 8 and 9, there is a direct driving connection from shaft 36 to shaft 76, and the gears 66, 68 and 70 turn freely with only the resistance occasioned by the oil in which they turn. The propeller shaft 76, etc., is then driven at the engine speed, when the driving, driven and third members turn together in the same direction.

When the clutch teeth 72 and 73 are disengaged, the gear 75 is brought into mesh with gear 70 (position R, Figure 8), the gear teeth 65 operate gears 66, 68 and 70 to turn gear 75 in the reverse direction and at a lower speed. Thus a slower reverse movement is given to the shaft 76 than the forward movement occurring at the power plant.

When the body 74 is in the central or neutral position (N, Figure 8), the driven shaft 36 is free to turn for moving the propeller shaft 76 in either direction, but its speed and momentum are limited, owing to the few parts which are engaged therewith, and the low weights of these parts, so that engagement for free forward or reverse motion is easily effected by moving the member 79.

The use of the auxiliary chamber, as shown in Figure 10, is found preferable under some conditions. From the above description of operation, it will be noted that normally a mixture of liquid and air is being ejected through the chordal discharge passages 31 against the inner surfaces of the general housing H. The liquid customarily is a lubricating oil and flows downward over the parts and into the housing HR to establish a thorough lubrication of all turning elements. During starting periods, and at other times when relative movement of the aforesaid driving, driven and third members is occurring, an excess of fluid is being delivered over that which is normally employed in lubrication of the parts, etc., and this immediately flows downward along the walls of the various structures, including the internal wall of the general housing H. This oil contains a considerable quantity of air and hence a frothing exists. While the partition 85 is normally sufficient to prevent the passage of oil having an undue quantity of air therein toward and into the supply passage 86, it is advisable in some instances to provide an auxiliary chamber in which the separation may be effected. Further, when a transmission of this nature operates for a considerable period of time with relative rotation of its said members, the losses of efficiency are represented by increase of temperature of the parts and in the oil, the oil ultimately serving to remove the excess heat. This auxiliary chamber may therefore be usefully employed as well for cooling the oil before its re-admission to the passage 86. For this purpose, an outlet connection 112 leads from the upper compartment of the general housing H for a gravital flow, usually under thermosyphon conditions, to the tank Z in which the oil bubbles are disengaged and in which the oil is permitted to cool by contact with the vessel walls. The oil, in liberating its air and cooling, tends to pass to the bottom of this tank and to move outwardly through the conduit 113 by gravity, and be returned in a cooler condition and with less air therein to the pump at the bottom of housing H.

It will be understood that this illustrative form is not restrictive, but that the invention may be employed in many ways within the scope of the appended claims.

Having thus described the invention, what I claim as new and desire to secure by Letters Patent, is:

1. A variable ratio transmission including a driving member, a driven member, a third member revoluble relative to both said driving and driven members, differentiating gearing connecting said members and including a planet pinion journalled on said driving member, liquid displacing means operative as a brake between said driving and third members, and means for admitting air to said liquid displacing means for reducing the braking action thereof.

2. A transmission as in claim 1 connected to an internal combustion engine having an intake and a throttle device, and means operated by the reduction in pressure at said intake when the throttle restricts flow thereto for operating said admitting means.

3. A variable ratio transmission including a driving member, a driven member, a third member revoluble relative to both said driving and driven members, differentiating gearing connecting said members and including a planet pinion journalled on said driving member, fluid displacing means operative as a brake between said driving and third members and including parts connected with said driving and third members, said driving member part including a discharge passage, and fixed means carried by said driving member part for restricting flow through said passage and operating as the sole means for determining the frictional resistance by restriction opposed to the flow of fluid through said passage.

4. A variable ratio transmission including a casing, a driving member, a driven member, a third member revoluble relative to both said driving and driven members, said members being coaxial, a pump housing connected to said driving member, a gear connected to said third member, an internally cut gear connected to said driven member, a planet pinion journalled for bodily movement during the rotation of said driving member, said gears and pinion being located in a plane at right angles to the common axis and intersecting said pump housing and providing a differentiating gearing connecting said members, an internal pump element located in and cooperative with said pump housing, bearings supporting said driving member in said casing at both ends of said pump housing, and bearings supporting said driven and third members within said housing.

5. A variable ratio transmission including a driving member, a driven member, a third member revoluble relative to both said driving and driven members, said driving member including a recessed housing and a pair of flanges closing the recesses of said housing, a fluid displacing element in one of said recesses, said third member including a second element in said recess and cooperative with the fluid displacing element and housing for displacing fluid, one said flange having inlet ports for the supply of fluid into said recess, a planet pinion journalled eccentrically on the other said flange, said third member and said driven member each including gear means which are in mesh with said planet pinion and provide therewith a differentiating gearing connecting said three members, and means for controlling the back pressure upon the displaced fluid.

6. A variable ratio transmission as in claim 5, in which said gear means on the driven member is an internally cut gear, and said other flange includes a structure enclosing said planet pinion and both said gear means.

7. A variable ratio transmission as in claim 5, in which said gear means on the driven member is an internally cut gear, and said other flange includes a structure enclosing said planet pinion and both said gear means, and centrifugally actuated braking means carried by said other flange and cooperative with the external surface of said internally cut gear.

8. A variable ratio transmission including a driving member, a driven member, a third member revoluble relative to both said driving and driven members, a fixed casing enclosing said members and providing a sump for liquids, bearings for supporting said members upon one another and in said casing, a fluid displacing means including cooperative elements connected to said driving member and to said third member and operative to draw liquid from said sump and deliver it to said casing, and fixed means carried with the driving member in its rotation for restricting the flow of fluid from said displacing means to said casing and operating as the sole means for determining the frictional resistance by restriction opposed to the flow of fluid through said passage.

9. A variable ratio transmission including a driving shaft, a coaxial driven shaft, a bearing sleeve overlapping both said shafts at their adjacent ends for maintaining their alignment, a fluid displacing element connected to said sleeve and surrounding a portion of said driving shaft, a cooperating fluid displacing structure connected to said driving shaft, a bearing between said sleeve and said structure surrounding a portion of said driven shaft, planet pinion means eccentrically mounted on said structure, and gears on said sleeve and said driven shaft in mesh with said pinion means.

10. A variable ratio transmission including a driving member, a driven member, a third member revoluble relative to both said driving and driven members, said members being revoluble about a common axis, braking means operative between said driving member and third member, differentiating gearing connecting said members including pinion means journalled eccentrically on said driving member and an internally cut large gear on said driven member and a smaller gear on said third member, and a non-overrunning clutch including elements between said driven and third members to prevent said driven member turning faster than said third member; said pinion means, gears and clutch elements being located in a plane at right angles to said common axis, said third member having bearings relative to both said driving and driven members at one side of and adjacent said plane, and said driving and driven members having bearing engagement also at the other side of said plane.

11. A variable ratio transmission including a driving member, a driven member, a third member revoluble relative to both said driving and driven members, differentiating gearing connecting said members including at least three planet pinion means eccentrically journalled on said driving member and engaged with gears on said driven and third members for distributing the tangential pressures and balancing radial pressures, and fluid displacing means connected with said driving and third members and including an inner gear and at least three outer gears meshing therewith for distributing and balancing the pressure effects in said displacing means.

12. A variable ratio transmission including a driving member, a driven member, a rotor structure comprising a pump housing connected to said driving member, a planet pinion journalled on said rotor structure eccentric to the axis of rotation thereof, a gear in mesh with said planet pinion, a liquid displacing element located in and cooperative with said pump housing and connected in driving relationship with said gear, a gear also in mesh with said planet pinion and connected in driving relationship with said driven member, said pump housing having a passage through which liquid is discharged to the exterior of said pump housing, means carried by the pump housing for restricting the flow of liquid through said passage, means by which liquid is passed to said pump housing and said liquid displacing element, means for selectively admitting air to said passing means, and a fixed casing including a portion surrounding said rotor structure, pinion and gears for receiving the liquid from said housing passage and passing it to said pinion and gears, and also including a portion in which the liquid is cooled and separated from air admixed therewith.

13. A variable ratio transmission including a driving member, a driven member, a third member revoluble relative to both said driving and driven members, differentiating gearing connecting said members and including planet pinion means eccentrically journalled on said driving member, a first braking means operative between said driving and third members for retarding the third member, and centrifugally actuated braking means carried by the driving member and upon high speed thereof engaging and accelerating the driven member, said centrifugally actuated braking means being free of such engagement at a low speed of the driving member.

14. A variable ratio transmission including a driving member, a driven member, a third member revoluble relative to both said driving and driven members, differentiating gearing connecting said members and including planet pinion means eccentrically journalled on said driving member, fluid displacing means operative between said driving and third members for retarding the third member, and centrifugally actuated braking means carried by the driving member and upon high speed thereof engaging and accelerating the driven member, said centrifugally actuated braking means being free of such engagement at a low speed of the driving member.

15. A variable ratio transmission including a driving member, a driven member, a third member revoluble relative to both said driving and driven members, differentiating gearing connecting said members and including a planet pinion journalled on said driving member, liquid displacing means operated as a brake between said driving and third members, means for admitting air to said liquid displacing means, and devices for actuating and controlling said admitting means whereby to determine the ratio of mixture of air and liquid admitted to said liquid displacing means for determining the braking action thereof.

16. A variable ratio transmission including a driving member, a driven member, a third member revoluble relative to both said driving and driven members, differentiating gearing connecting said members and including a planet pinion journalled on said driving member, liquid displacing means operated as a brake between said driving and third members, means for admitting air to said liquid displacing means, devices for actuating and controlling said admitting means whereby to determine the ratio of mixture of air and liquid admitted to said liquid displacing means for determining the braking action thereof, said displacing means including a discharge passage, and a fixed plug in said passage for restricting flow through said discharge passage.

17. A variable ratio transmission including a driving member, a driven member, a third member revoluble relative to both said driving and driven members, differentiating gearing connecting said members and including a planet pinion journalled on said driving member, fluid displacing means operative as a brake between said driving and third members and including a housing connected with said driving member, a small pinion in said housing and journalled on an axis for bodily movement with the housing during the rotation of the latter, a larger gear located in said housing and fixed to said third member, said small pinion and large gear being constantly in mesh and operating in said housing as a fluid displacing device, said housing including a discharge passage, and means for controlling the fluid pressure reaction effect in said displacing means including a device carried by said housing and located in said discharge passage for retarding the flow of fluid therethrough.

OTTO E. SZEKELY.